United States Patent [19]

Hsu

[11] 4,424,371

[45] Jan. 3, 1984

[54] 3-CHLORO-4-CYANOPHENYL 4'-SUBSTITUTED BENZOATES

[75] Inventor: Ying-Yen Hsu, Los Altos, Calif.

[73] Assignee: Timex Corporation, Waterbury, Conn.

[21] Appl. No.: 422,048

[22] Filed: Sep. 23, 1982

[51] Int. Cl.³ .................. G02F 1/13; C09K 3/34; C07D 319/04
[52] U.S. Cl. .................. 549/373; 252/299.61; 252/299.63; 252/299.65; 260/465 D; 260/465 F; 260/465 G; 549/374; 549/375
[58] Field of Search ............... 549/369, 373, 374, 375; 252/299.61, 299.63, 299.65; 260/465 D, 465 F, 465 G

[56] References Cited

U.S. PATENT DOCUMENTS

| 4,017,416 | 4/1977 | Inukai et al. | |
| 4,198,312 | 4/1980 | Sato et al. | 252/299.67 |
| 4,200,580 | 4/1980 | Hsu | 252/299.61 |
| 4,229,315 | 10/1980 | Krause et al. | 252/299.63 |
| 4,313,878 | 2/1982 | Hsu | 252/299.61 |
| 4,344,856 | 8/1982 | Demus et al. | 252/299.61 |
| 4,348,324 | 9/1982 | Demus et al. | 252/299.61 |

FOREIGN PATENT DOCUMENTS

| 19665 | 12/1980 | European Pat. Off. | 252/299.63 |
| 53-75181 | 7/1978 | Japan | 252/299.65 |
| 57-154158 | 9/1982 | Japan | 252/299.63 |
| WO81/00853 | 4/1981 | PCT Int'l Appl. | 252/299.67 |

Primary Examiner—Teddy S. Gron
Attorney, Agent, or Firm—William C. Crutcher; Joseph A. Biela

[57] ABSTRACT

Disclosed are compounds of the formula:

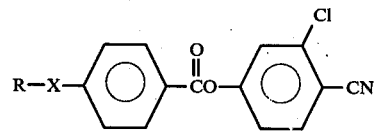

wherein R is an alkyl group having 1 to 8 carbon atoms and X is a dioxane, cyclohexane, or benzene ring. The compounds of the invention are suitable as liquid crystal materials in electrooptical displays. Specifically, when added to nematic liquid crystals, these compounds provide an increase in the positive dielectric anisotropy of the liquid crystal composition.

5 Claims, No Drawings

3-CHLORO-4-CYANOPHENYL 4'-SUBSTITUTED BENZOATES

BACKGROUND OF THE INVENTION

The present invention relates to nematic liquid crystal compounds which are suitable for use in electrooptical displays, especially of the multiplexed type.

For display devices based on the twisted nematic field effect, it is recognized in the art that the nematic liquid crystal composition should exhibit positive dielectric anisotropy and be aligned on supporting substrates to provide for an initially twisted structure.

When the twisted nematic liquid crystal is interposed between two transparent electrode plates, the liquid crystal molecules form a homogeneous alignment wherein the long axes of the molecules are aligned in a direction parallel to the electrode plates. When an electric field is applied to the positive dielectric anisotropic liquid crystal material, the liquid crystal molecules take on a homeotropic alignment wherein the axes of the molecules become perpendicularly aligned with respect to the electrode plates. This alignment is due to the positive dielectric anisotropy of the liquid crystal.

Before the electric field is applied across the electrode plates, the liquid crystal molecules form a helical arrangement, twisted at a certain angle, between the electrode plates and, as a result, polarize the incident light. When a voltage is applied across the electrode plates, the liquid crystal molecules are aligned such that its polarizing ability disappears.

Adjusting the dielectric anisotropy of the nematic liquid crystals affects the threshold voltage of the liquid crystal. Specifically, increasing the positive dielectric anisotropy decreases the threshold voltage thereby enabling the electrooptic display to be operated at low voltages. For this purpose, compounds having a very high positive dielectric anisotropy are used for controlling liquid crystal dielectric constants. For example, addition of such compounds to nematic liquid crystals having negative dielectric anisotropy permits the use of such relatively low dielectric anisotropic material to be used in the field effect display mode.

Compounds used to adjust positive dielectric anisotropy in order to minimize the power requirements for an electrooptical display device are disclosed in U.S. Pat. No. 4,313,878 issued to Hsu and assigned to the Timex Corporation and U.S. Pat. No. 4,198,312 issued to Sato et al. and assigned to Dainippon Inc. & Chemicals, Inc. and Hitachi, Ltd.

It is an object of this invention to provide novel dielectric constant controlling compounds for increasing the positive dielectric anisotropy of liquid crystal mixtures.

It is another object of the invention to provide a new family of compounds that improve liquid crystal properties to provide for optimum display operation.

SUMMARY OF THE INVENTION

In accordance with the present invention there is provided a new family of compounds which are liquid crystal materials having either a dioxane, cyclohexane, or benzene moiety attached to aromatic ester molecules. A lateral chlorine atom is attached ortho to the cyano group which is distal to the attached dioxane, cyclohexane or benzene moieties. The liquid crystals containing these compounds are used for multiplexing or low voltage electrooptical displays. The new family of compounds is illustrated by the following structural formula:

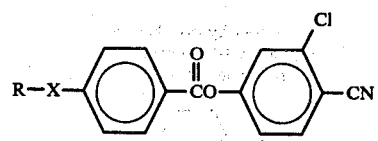

where R is an alkyl group having one to eight carbon atoms and X is a dioxane, cyclohexane, or benzene ring. The compounds are characterized by their increasing positive dielectric anisotropic effect on liquid crystals.

The compounds of the invention are prepared by at least the four following methods:

METHOD I

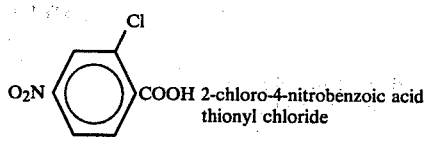 STEP 1

2-chloro-4-nitrobenzoic acid
thionyl chloride

↓ SOCl$_2$

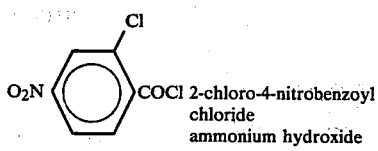 STEP 2

2-chloro-4-nitrobenzoyl chloride
ammonium hydroxide

↓ NH$_4$OH

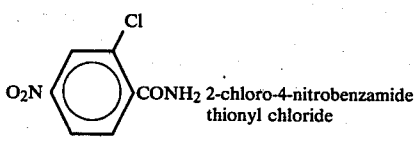 STEP 3

2-chloro-4-nitrobenzamide
thionyl chloride

↓ SOCl$_2$

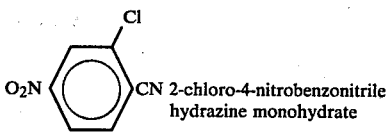 STEP 4

2-chloro-4-nitrobenzonitrile
hydrazine monohydrate

↓ N$_2$H$_4$·H$_2$O

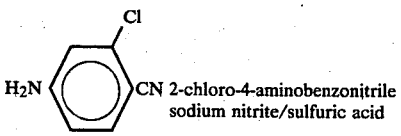 STEP 5

2-chloro-4-aminobenzonitrile
sodium nitrite/sulfuric acid

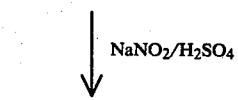

4,424,371

3

-continued

STEP 6

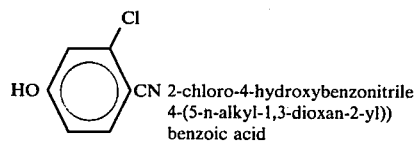 2-chloro-4-hydroxybenzonitrile
4-(5-n-alkyl-1,3-dioxan-2-yl))
benzoic acid

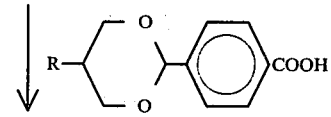

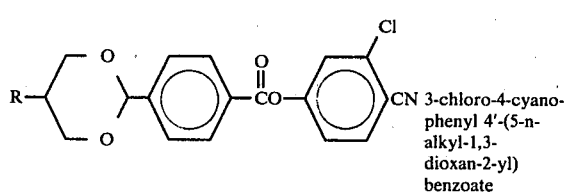 3-chloro-4-cyano-
phenyl 4'-(5-n-
alkyl-1,3-
dioxan-2-yl)
benzoate

METHOD II

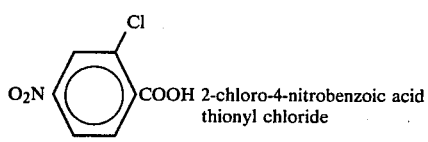 2-chloro-4-nitrobenzoic acid
thionyl chloride

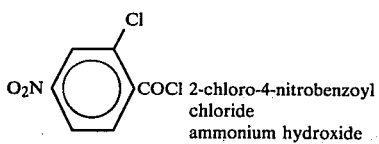 2-chloro-4-nitrobenzoyl
chloride
ammonium hydroxide

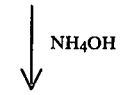

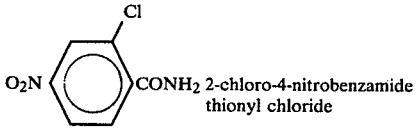 2-chloro-4-nitrobenzamide
thionyl chloride

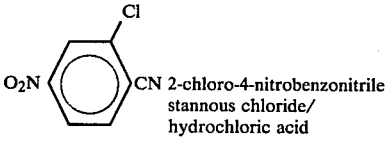 2-chloro-4-nitrobenzonitrile
stannous chloride/
hydrochloric acid

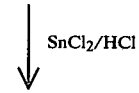

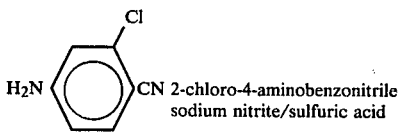 2-chloro-4-aminobenzonitrile
sodium nitrite/sulfuric acid

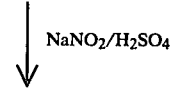

4

-continued

STEP 6

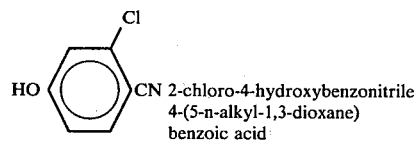 2-chloro-4-hydroxybenzonitrile
4-(5-n-alkyl-1,3-dioxane)
benzoic acid

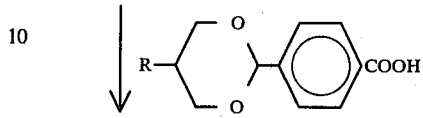

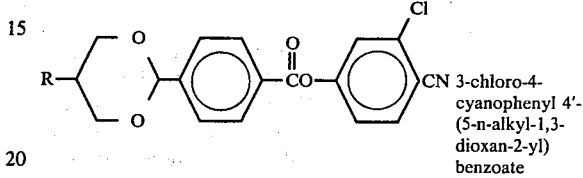 3-chloro-4-
cyanophenyl 4'-
(5-n-alkyl-1,3-
dioxan-2-yl)
benzoate

METHOD III

STEP 1

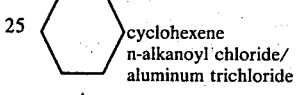 cyclohexene
n-alkanoyl chloride/
aluminum trichloride

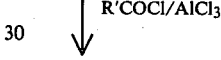

STEP 2

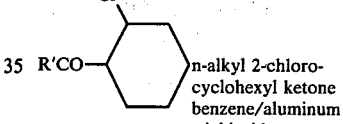 n-alkyl 2-chloro-
cyclohexyl ketone
benzene/aluminum
trichloride

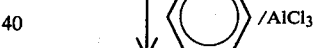

STEP 3

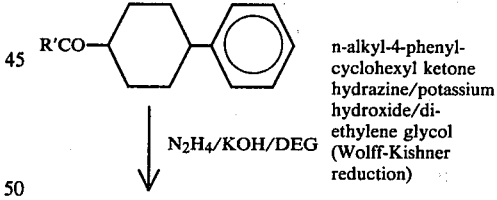 n-alkyl-4-phenyl-
cyclohexyl ketone
hydrazine/potassium
hydroxide/di-
ethylene glycol
(Wolff-Kishner
reduction)

STEP 4

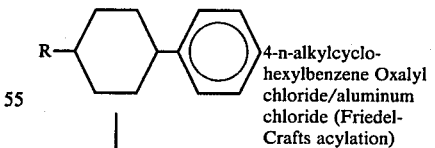 4-n-alkylcyclo-
hexylbenzene Oxalyl
chloride/aluminum
chloride (Friedel-
Crafts acylation)

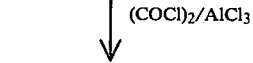

STEP 5

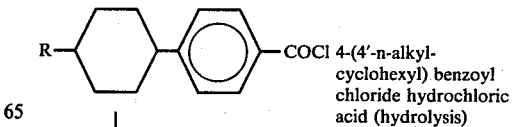 4-(4'-n-alkyl-
cyclohexyl) benzoyl
chloride hydrochloric
acid (hydrolysis)

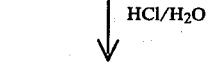

-continued

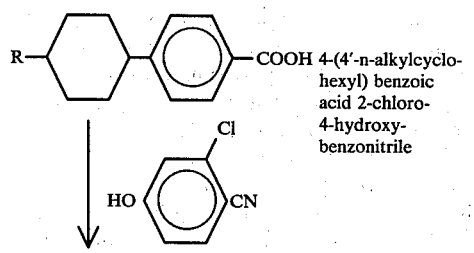 4-(4'-n-alkylcyclohexyl) benzoic acid 2-chloro-4-hydroxybenzonitrile

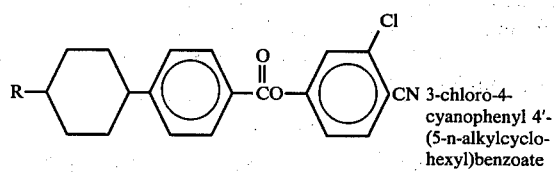 3-chloro-4-cyanophenyl 4'-(5-n-alkylcyclohexyl)benzoate

METHOD IV

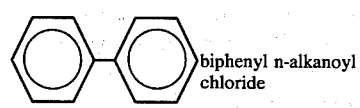 biphenyl n-alkanoyl chloride

R'COCl

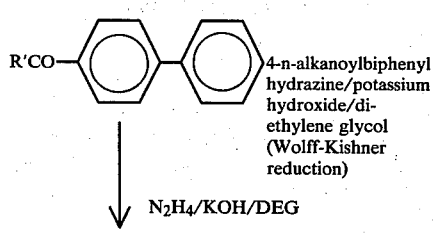 4-n-alkanoylbiphenyl hydrazine/potassium hydroxide/diethylene glycol (Wolff-Kishner reduction)

N₂H₄/KOH/DEG

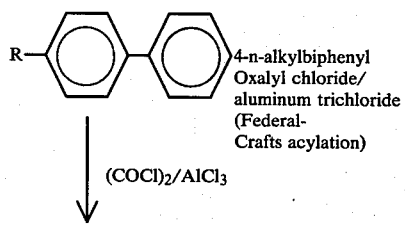 4-n-alkylbiphenyl Oxalyl chloride/aluminum trichloride (Federal-Crafts acylation)

(COCl)₂/AlCl₃

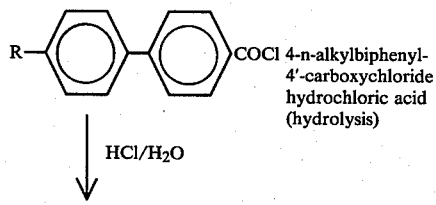 4-n-alkylbiphenyl-4'-carboxychloride hydrochloric acid (hydrolysis)

HCl/H₂O

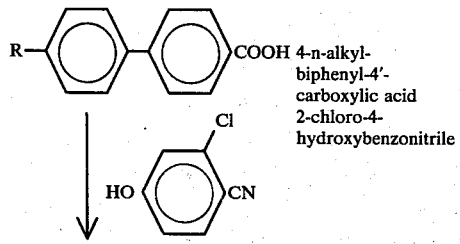 4-n-alkyl-biphenyl-4'-carboxylic acid 2-chloro-4-hydroxybenzonitrile

STEP 6

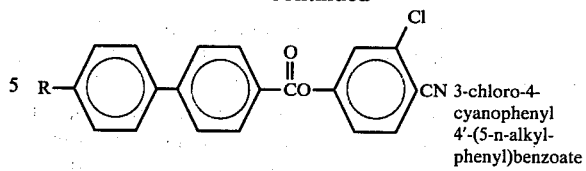 3-chloro-4-cyanophenyl 4'-(5-n-alkylphenyl)benzoate

The nature of the invention may be better understood by the following representative embodiments which are included to illustrate the nature of the invention without limiting its scope which is defined in the claims.

DESCRIPTION OF PREFERRED EMBODIMENTS

EXAMPLE 1

3-Chloro-4-cyanophenyl 4'-(5-n-pentyl-1,3-dioxan-2-yl) benzoate

Step 1

In accordance with Method I, halogenating agent thionyl chloride (800 g, 6.72 m) was added to 2-chloro-4-nitrobenzoic acid (500 g, 2.48 m) while the reaction mixture was warmed. After addition, the mixture was refluxed for approximately three hours. The excess of the low-boiling thionyl chloride was removed by distillation and the residue reaction mixture was vacuum-distilled to yield 2-chloro-4-nitrobenzoyl chloride (510 g, 93% bp. 143° C./4 mm).

Step 2

Thereafter, 2-chloro-4-nitrobenzoyl chloride (450 g, 2.1 m) was added dropwise to a stirred 28% ammonia solution (2,000 ml) at below room temperature between 9° and 16° C. The precipitated reaction mixture was washed with water and 30% methanol and then vacuum-dried to yield 2-chloro-4-nitrobenzamide (379 g, 90%, mp 168°-170° C.).

Step 3

Thionyl chloride (1,000 g, 8.4 m) was then added to the 2-chloro-4-nitrobenzamide (200 g, 1 m) while the mixture was warmed. After addition, the mixture was refluxed for approximately three hours. The excess thionyl chloride was removed by distillation leaving a reaction mixture residue. Benzene (500 ml) was added to the cold reaction mixture residue to extract the reaction product. The extract was washed with diluted sodium hydroxide solution and water until neutralized and then dried over anhydrous sodium sulfate. The benzene solvent was distilled off and the reaction product was crystallized from methanol to yield 2-chloro-4-nitrobenzonitrile (145 g, 79%, mp 73°-75° C.).

Step 4

A portion of 2-chloro-4-nitrobenzonitrile (5 g, 0.027 m) was heated with hydrazine monohydrate (110 ml) until the reaction began. Another portion of 2-chloro-4-nitrobenzonitrile (35 g, 0.192 m) was added in predetermined amounts. Once the evolution of nitrogen gas ceased, the reaction mixture was refluxed approximately thirty minutes, and then poured into stirred ice water. The precipitate was filtered and the solid was crystallized from water to yield 2-chloro-4-aminobenzonitrile (25 g, 78%, mp 117° C.).

Step 5

A mixture of 2-chloro-4-aminobenzonitrile (25 g, 187 m) in stirred concentrated sulfuric acid (58 g) and water (570 ml) was heated at between 49° and 61° C. for approximately thirty minutes. The suspension was cooled to approximately 0° C. and a cold solution of sodium nitrite (13.2 g, 0.187 m) in water (125 ml) was added dropwise at a solution temperature of between 0° and 6° C. Stirring continued thereafter for approximately three hours and then urea (1.5 g) was added to the mixture. The resulting insoluble impurity was filtered off. An aqueous solution of 50% sulfuric acid (600 ml) was added while the reaction mixture was heated at a temperature between 74° and 81° C. and stirred until the evolution of nitrogen gas ceased. The reaction product was separated by filtration and then recrystallized from water to yield 2-chloro-4-hydroxybenzonitrile (17.9 g, 62.5%, mp 160° C.).

Step 6

Dicyclohexylcarbordiimide (2.1 g, 0.01 m) was added to a stirred solution of 4-(5-n-pentyl-1,3-dioxan-2-yl) benzoic acid (2.78 g, 0.01 m), 2-chloro-4-hydroxybenzonitrile (1.8 g, 0.012 m), 4-dimethylaminopyridine (0.1 g) in N,N-dimethylformamide (25 ml) at approximately 0° C. Stirring continued for about one hour at approximately 0° C. and for about four hours at approximately 20° C. Methylene chloride (40 ml) was then added to the reaction mixture. The precipitated urea was filtered off and the filtrate was washed with 0.5 N hydrochloric acid, saturated sodium bicarbonate solution and water and then dried over anhydrous sodium sulfate. The remaining reaction mixture was purified by elution through a silica gel column using methylene chloride as a solvent. The solvent was evaporated and the reaction product was crystallized from ethanol to yield 3-chloro-4-cyanophenyl 4'-(5-n-pentyl-1,3-dioxan-2-yl) benzoate (2.8 g, 67.7%); CN 115° C.; NI 138° C.

Method II differs from Method I in that the synthetic steps 4 and 5 are different. Synthetic steps 4 and 5 in Method I (and Example 1) are implemented to provide a better yield over steps 4 and 5 in Method II (and Example 2).

EXAMPLE 2

3-chloro-4-cyanophenyl 4'-(5-n-pentyl-1,3-dioxan-2-yl) benzoate

Step 1

In accordance with Method II, thionyl chloride (800 g, 6.72 m) was added to 2-chloro-4-nitrobenzoic acid (500 g, 2.48 m) while the reaction mixture was warmed. After addition, the mixture was refluxed for approximately three hours. The excess thionyl chloride was removed by distillation and the remaining reaction mixture was vacuum-distilled to yield 2-chloro-4-nitrobenzoyl chloride (510 g, 93% bp 143° C./4 mm).

Step 2

Thereafter, 2-chloro-4-nitrobenzoyl chloride (460 g, 2.1 m) was added dropwise to a stirred 28% ammonia solution (2000 ml) at between 10° and 15° C. The precipitate was washed with water and 30% methanol and then dried to yield 2-chloro-4-nitrobenzamide (379 g, 90%, mp 168°-170° C.).

Step 3

Thionyl chloride (1,000 g, 8.4 m) was added to the product obtained from the second step (200 g, 1 m) while the mixture was warmed. After addition, the mixture was refluxed for approximately three hours. The excess thionyl chloride was removed by distillation leaving a reaction mixture residue. A solvent, benzene (500 ml), was added to the cold reaction mixture residue to extract the reaction product. The extracted product was washed with diluted sodium hydroxide solution and water until neutralized and then dried over anhydrous sodium sulfate. The benzene solvent was distilled off and the reaction product was crystallized from methanol to yield 2-chloro-4-nitrobenzonitrile (145 g, 79%, mp 73°-75° C.).

Step 4

A portion of the product from the third step (122 g, 0.61 m) was added to a cold stirred solution of stannous chloride (500 g, 2.22 m) in 28% hydrochloric acid (500 ml). The resulting reaction mixture was permitted to react at between 24° and 36° C. for approximately five hours and then cooled and then alkalized with a concentrated sodium hydroxide alkaline solution. The reaction product was extracted with a solvent such as diethyl ether. The solvent was distilled from the extract and the resulting product was crystallized from an aqueous ethanol solution to yield the fourth step product 2-chloro-4-aminobenzonitrile (70 g, 75%, mp 117° C.).

Step 5

The 2-chloro-4-aminobenzonitrile (57 g, 0.37 m) was added to a cold stirred solution of concentrated sulfuric acid (115 g) in water (1,000 ml). Then a cold solution of sodium nitrite (26.5 g, 0.38 m) in water (250 ml) was added to the suspension solution at a temperature between 0° and 6° C. Upon addition of the sodium nitrite, stirring continued for approximately three hours at which time urea (3 g) was added to the reaction mixture. The reaction mixture reacted at a temperature between 69° and 76° C. for approximately three hours. The reaction product was filtered and crystallized from water to yield the fifth step product 2-chloro-4-hydroxybenzonitrile (18.8 g, 33%, mp 157°-158° C.).

Step 6

Dicyclohexylcarbodiimide (2.1 g, 0.01 m) was added to a stirred solution of 4-(5-n-pentyl-1,3-dioxan-2-yl) benzoic acid (2.78 g, 0.01 m), 2-chloro-4-hydroxybenzonitrile (1.8 g, 0.012 m), 4-dimethylaminopyridine (0.1 g) in N,N-dimethylformamide (25 ml) at approximately 0° C. Stirring continued for about one hour at a solution temperature of approximately 0° C. and for approximately four hours at a solution temperature of approximately 20° C. Methylene chloride (40 ml) was then added to the reaction mixture. The precipitated urea was filtered off and the filtrate was washed with 0.5 N hydrochloric acid, saturated sodium bicarbonate solution and water and then dried over anhydrous sodium sulfate. The remaining reaction mixture was purified by elution through a silica gel column using methylene chloride as a solvent. The solvent was evaporated and the reaction product was crystallized from ethanol to yield 3-chloro-4-cyanophenyl 4'-(5-n-pentyl-1,3-dioxan-2-yl) benzoate (2.8 g, 67.7%); CN 115° C.; NI 183° C.

EXAMPLE 3

3-Chloro-4-cyanophenyl 4'-(5-n-alkylcyclohexyl) benzoate

In accordance with Method III and using, in part, synthesis B described in U.S. Pat. No. 4,323,504 issued to Sethofer and assigned to the Timex Corporation including well-known Wolff-Kishner reduction, Freidel-Crafts acylation and hydrolysis techniques, Example 3 broadly describes the steps performed in the synthesis of the above substituted benzoate.

Step 1

Cyclohexene, which is commercially available or prepared according to well-known methods, was reacted with an alkanoyl chloride and aluminum trichloride in an inert solvent such as hexane at low temperatures. In particular, the reaction began at −60° C. and continued while the temperature increased to 40° C. and yielded an alkyl ketone, i.e., n-alkyl 2-chlorocyclohexyl ketone.

Step 2

The hexane was decanted and an excess of benzene with an additional amount of aluminum trichloride was added and the reaction was allowed to proceed at +45° C. The halogen atom (chlorine) deactivated the ring to which it was attached and directed attachment of benzene to the para position with respect to the acyl group attached to the cyclohexane ring to form a stable n-alkyl 4-phenylcyclohexyl ketone.

Step 3

The product of step two was reduced by well-known Wolff-Kishner reduction in order to convert the acyl group into an alkyl group. This yielded 4-n-alkylcyclohexylbenzene.

Step 4

The product of step three then underwent electrophilic aromatic substitution by an acylium ion by well-known Freidel-Crafts acylation to yield 4-(4-n-alkylcyclohexyl) benzoyl chloride.

Step 5

The benzoyl chloride was hydrolyzed to a carboxylic acid, i.e., 4-(4'-n-alkylcyclohexyl) benzoic acid.

Step 6

The benzoic acid from step five was converted into its ester by reaction with 2-chloro-4-hydroxybenzonitrile to yield 3-chloro-4-cyanophenyl 4'-(5-n-alkylcyclohexyl) benzoate.

EXAMPLE 4

3-Chloro-4-cyanophenyl 4-(4'-n-alkylphenyl) benzoate

Step 1

In accordance with Method IV, aluminum chloride (160 g, 1.2 m) was added to a stirred solution of biphenyl (154 g, 1 m) in a methylene chloride (1000 ml) at a temperature of approximately −20° C. Then, an n-alkanoyl chloride (n-pentanoyl chloride (132 g, 1.1 m) was added to the solution at a temperature below −10° C. After addition, stirring continued for approximately three hours and the reaction temperature was allowed to rise to approximately 0° C. The resulting reaction mixture was poured into ice water. The nonmiscible layers were separated and the organic layer was washed with water until neutralized. The solvent was removed by distillation and the residue reaction mixture was vacuum distilled to yield 4-n-alkanoylbiphenyl (4-n-pentanoylbiphenyl (202 g, 84.8%, mp 74.5 C).)

Step 2

A stirred mixture of the 4-n-alkanoylbiphenyl (4-n-pentanoylbiphenyl) (202 g, 0.848 m)), diethylene glycol (1200 ml), hydrazine (176 ml) and potassium hydroxide (168 g) was refluxed for approximately three hours. The resulting water was removed by distillation until the reaction temperature was raised to approximately 175° C. The refluxion was continued at approximately 175° C. for about six hours. The resulting reaction mixture was poured into ice water and was extracted with hexane. The organic extract was washed with water until neutralized. The solvent was removed by distillation and the residue reaction mixture was vacuum-distilled to yield 4-n-alkylbiphenyl (4-n-pentylbiphenyl (142 g, 75%, bp 140° C./10 mm).

Step 3

Aluminum chloride (160 g, 1.2 m) was added to a stirred solution of the 4-n-alkylbiphenyl (4-n-pentylbiphenyl (224 g, 1 ml)) in methylene chloride (1000 ml) at approximately −20° C. Then oxalyl chloride (96 ml) was added to the solution at a temperature below −10° C. After addition, the reaction temperature was allowed to rise to approximately 0° C. Stirring continued at approximately 0° C. until the evolution of hydrogen chloride gas ceased. The resulting reaction mixture was poured into ice water forming two nonmiscible fluid layers. The organic layer was separated from the aqueous layer, washed with water, and dried over anhydrous sodium sulfate. The solvent was removed by distillation to yield a crude 4-n-alkylbiphenyl-4'-carboxy chloride (4-n-pentylbiphenyl-4'-carboxy chloride (213 g, 75%)) which was used directly in the next step.

Step 4

The 4-n-alkylbiphenyl-4'-carboxy chloride (4-n-pentylbiphenyl-4'-carboxy chloride (142 g, 0.5 m)) was reacted with a hot, stirred solution of sodium hydroxide (60 g, 0.75 m) in water (50 ml) and acetone (500 ml) for about three hours. The cold reaction mixture was then acidified with concentrated hydrochloric acid solution. The acid was filtered and washed with water until the filtrate was neutralized. The product of the reaction was purified from ethanol to yield 4-n-alkylbiphenyl-4'-carboxylic acid (4-n-pentylbiphenyl-4'-carboxylic acid (102.4 g, 80%).

Step 5

The 4-n-alkylbiphenyl-4'-carboxylic acid (4-n-pentylbiphenyl-4'-carboxylic acid (16.2 g, 0.06 m)) was esterified by reaction with 2-chloro-4-hydroxybenzonitrile (9.18 g, 0.06 m) to yield 3-chloro-4-cyanophenyl 4'-(5-n-alkylphenyl) benzoate (3-chloro-4-cyanophenyl 4'-(5-n-pentylphenyl) benzoate (18.3 g, 78%)); CN 95.4° C.; NI 138.3° C.

Additional examples of compounds of the invention, along with their transition temperatures are given in Table I below.

TABLE I

Phase Transition Temperature of 3-Chloro-4-Cyanophenyl 4'-Substituted Benzoates

Y—⟨phenyl⟩—CO—O—⟨phenyl(Cl)(CN)⟩

| Compound | Y | Transition Temperature °C. CN(CI) | NI(IN) |
|---|---|---|---|
| 1 | C₂H₅-dioxane | (151.3) | (125.0) |
| 2 | C₃H₇-dioxane | 126.8 | 146.8 |
| 3 | C₄H₉-dioxane | 123.8 | 142.7 |
| 4 | C₅H₁₁-dioxane | 117.0 | 137.8 |
| 5 | C₆H₁₃-dioxane | 96.8 | 134.8 |
| 6 | C₇H₁₅-dioxane | 107.1 | 134.3 |
| 7 | C₈H₁₇-dioxane | 101.8 | 128.8 |
| 8 | C₂H₅-cyclohexyl | 96.3 | 121.1 |
| 9 | C₃H₇-cyclohexyl | 99.0 | 146.3 |
| 10 | C₄H₉-cyclohexyl | 84.8 | 138.5 |
| 11 | C₅H₁₁-cyclohexyl | 82.0 | 142.0 |
| 12 | C₇H₁₅-cyclohexyl | 96.8 | 139.0 |
| 13 | C₅H₁₁-cyclohexyl | 95.4 | 138.3 |

The compounds of the present invention

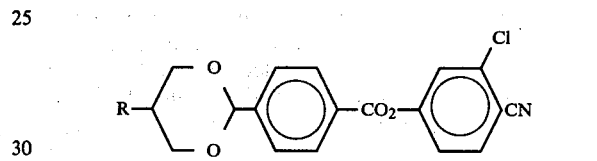

are distinctive over the prior art in terms of its potential use in liquid crystal mixture formulation.

For example, the compounds having the general formula

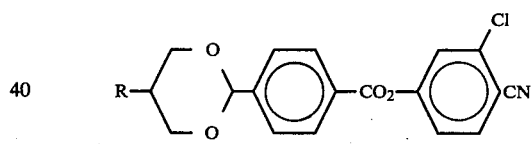

as shown in U.S. Pat. No. 4,313,878 issued to Hsu, exhibit a very high NI point and a wide nematic temperature range. However, the amount of the compounds that can be used in a liquid crystal mixture will be limited due to their very high CN points.

The compounds in U.S. Pat. No. 4,198,312 issued to Sato et al. having the general formula

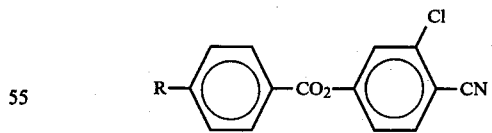

are non-liquid crystalline compounds with low melting points. When the compounds of the patent are used in a liquid crystal mixture, the NI point of the mixture will drop sharply as the amount used increases.

The compounds of the present invention are all nematic and have low CN points relative to the compounds in the above-mentioned Hsu patent thereby permitting their use in a broad range of liquid crystal mixture formulations.

Furthermore, the benzoate compounds exhibit the lowest threshold voltage at 10% saturation with respect to the compounds of the above-mentioned patents. In particular when R is $C_5H_{11}$ in each of the above compounds, and the resulting compound is mixed with 6.1 mole % in MBBA (4-methoxybenzylidene 4'-n-butylaniline), the lowest threshold voltage for

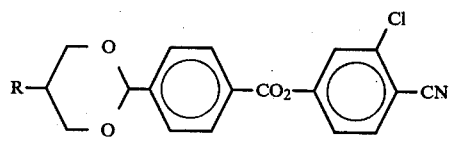

is 1.88 volts, for

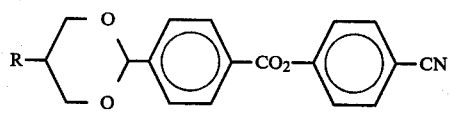

is 2.07 volts and for

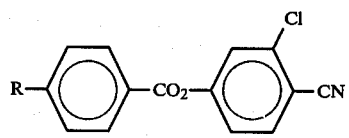

is 1.90 volts.

The compounds having a lateral chlorine atom at the ortho position to the cyano group exhibit a greater positive dielectric anisotropy than compounds, for example, without the chlorine atom.

What is claimed is:

1. A compound of the formula:

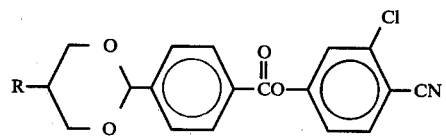

wherein R is an alkyl group having 1 to 8 carbon atoms.

2. A nematic liquid crystal compound for electrooptic displays having the formula:

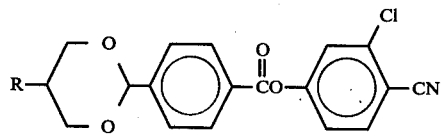

wherein R is an alkyl group having 1 to 7 carbon atoms.

3. The compound of claim 1 or 2 wherein R is selected from the group consisting of $C_2H_5$, $C_3H_7$, $C_4H_9$, and $C_7H_{15}$.

4. The compound of claims 1 or 2 wherein R is $C_5H_{11}$.

5. The compound of claim 1 or 2 wherein R is selected from the group consisting of $C_5H_{13}$ and $C_8H_{17}$.

* * * * *